(12) United States Patent
Dora

(10) Patent No.: US 11,466,501 B2
(45) Date of Patent: Oct. 11, 2022

(54) MOTORIZED HINGE

(71) Applicant: FARINGOSI HINGES S.R.L., Ospitaletto (IT)

(72) Inventor: Massimo Dora, Ospitaletto (IT)

(73) Assignee: FARINGOSI HINGES S.R.L., Ospitaletto (IT)

( * ) Notice: Subject to any disclaimer, the term of this patent is extended or adjusted under 35 U.S.C. 154(b) by 258 days.

(21) Appl. No.: 16/937,903

(22) Filed: Jul. 24, 2020

(65) Prior Publication Data

US 2021/0025214 A1    Jan. 28, 2021

(30) Foreign Application Priority Data

Jul. 24, 2019   (IT) .......................... 202019000002526

(51) Int. Cl.
*E05F 15/622* (2015.01)
*F16H 25/20* (2006.01)

(52) U.S. Cl.
CPC ........... *E05F 15/622* (2015.01); *F16H 25/20* (2013.01); *E05Y 2201/41* (2013.01);
(Continued)

(58) Field of Classification Search
CPC ............... E05F 15/622; E05Y 2201/41; E05Y 2201/422; E05Y 2900/30; E05Y 2900/308; F16H 25/20; F16H 2025/2075
See application file for complete search history.

(56) References Cited

U.S. PATENT DOCUMENTS 10,745,953 B2 *  8/2020  Xu ........................... E05F 1/105
11,346,561 B2 *  5/2022  Ryu ...................... F24C 15/162
(Continued)

FOREIGN PATENT DOCUMENTS

WO    2014111827    7/2014

OTHER PUBLICATIONS

Turkish search report and written opinion dated Jan. 24, 2022 for corresponding Turkish utility model application No. 2020/11604 and reporting email from the local agent in EN language.

*Primary Examiner* — David M Fenstermacher
(74) *Attorney, Agent, or Firm* — Silvia Salvadori

(57) ABSTRACT

A hinge (1) for connecting a door to a household appliance compartment is described, comprising a fastening bracket (2) adapted to be fastened to the compartment of said household appliance, a movable support (3) to rotatably constrain said door to said fastening bracket (2), an activating arm (5) coupled to said fastening bracket (2), movement means (6) adapted to move said activating arm (5), said activating arm (5) comprising a first end portion (5a) adapted to be constrained to said door, and a second end portion (5b) fitted to be coupled to said movement means (6) to move said activating arm (5) between an open position (P2) of the door and a closed position (P1) of the door, said movement means (6) comprising an electric motor (10) and reversible connecting means (9) to couple and decouple selectively said electric motor (10) and said second end portion (5b), said hinge (1) being configured so that when said electric motor (10) is coupled to said second end portion (5b), the electric motor (10) causes the movement of the activating arm (5), whereas when said electric motor (10) is decoupled from said second end portion (5b), the movement (Continued)

of the first end portion (5a) occurs independently of the electric motor (10) to allow a user to freely move the door.

17 Claims, 4 Drawing Sheets

(52) U.S. Cl.
CPC ..... *E05Y 2201/422* (2013.01); *E05Y 2900/30* (2013.01); *E05Y 2900/308* (2013.01); *F16H 2025/2075* (2013.01)

(56) References Cited

U.S. PATENT DOCUMENTS

| | | | |
|---|---|---|---|
| 2018/0245391 A1 | 8/2018 | Margonari et al. | |
| 2019/0040670 A1* | 2/2019 | Dora | E05F 15/63 |
| 2019/0106925 A1* | 4/2019 | McCorkell | F16H 25/24 |
| 2019/0203947 A1 | 7/2019 | Meurer et al. | |
| 2019/0353353 A1* | 11/2019 | White | E05F 3/20 |
| 2019/0383496 A1* | 12/2019 | Scalf | F24C 15/023 |
| 2020/0190883 A1* | 6/2020 | Scheuring | E05F 3/16 |
| 2020/0367626 A1* | 11/2020 | Hugues | A45C 13/005 |
| 2020/0408287 A1* | 12/2020 | Gassner | F16H 25/20 |
| 2021/0025214 A1* | 1/2021 | Dora | E05F 15/622 |
| 2021/0071456 A1* | 3/2021 | Gherardi | E05F 5/02 |
| 2021/0230923 A1* | 7/2021 | Yokozawa | H02P 6/08 |
| 2021/0270075 A1* | 9/2021 | Sakiyama | F16H 25/20 |
| 2021/0293071 A1* | 9/2021 | Leonard | E05F 15/622 |
| 2021/0396300 A1* | 12/2021 | Inagaki | F16H 25/2021 |
| 2022/0136309 A1* | 5/2022 | Cappelli | B60J 5/106 49/31 |
| 2022/0149761 A1* | 5/2022 | Battlogg | H02P 6/28 |

\* cited by examiner

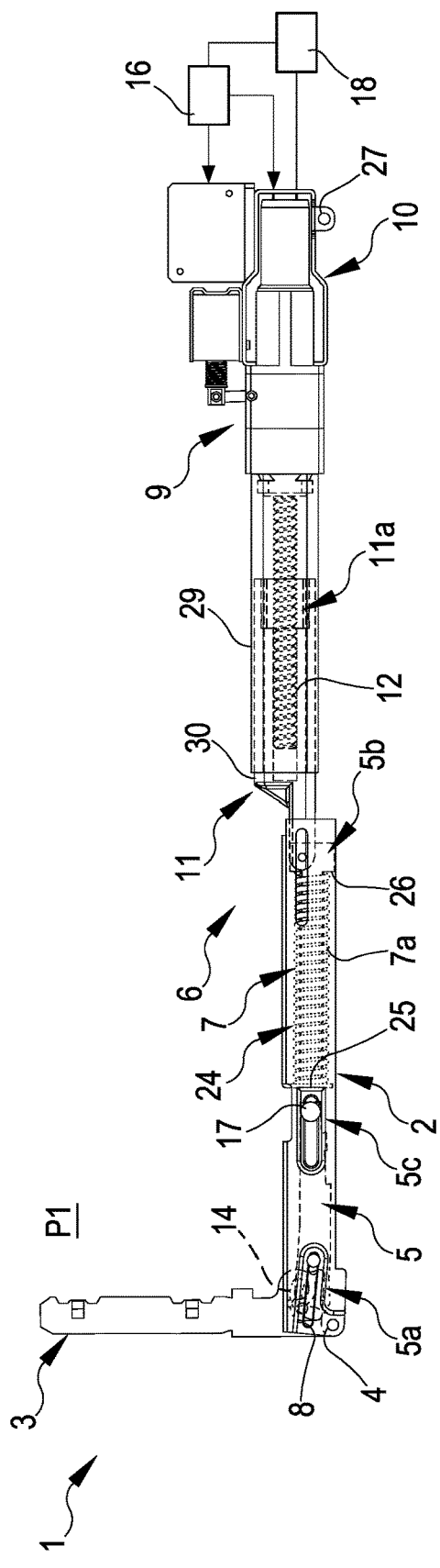
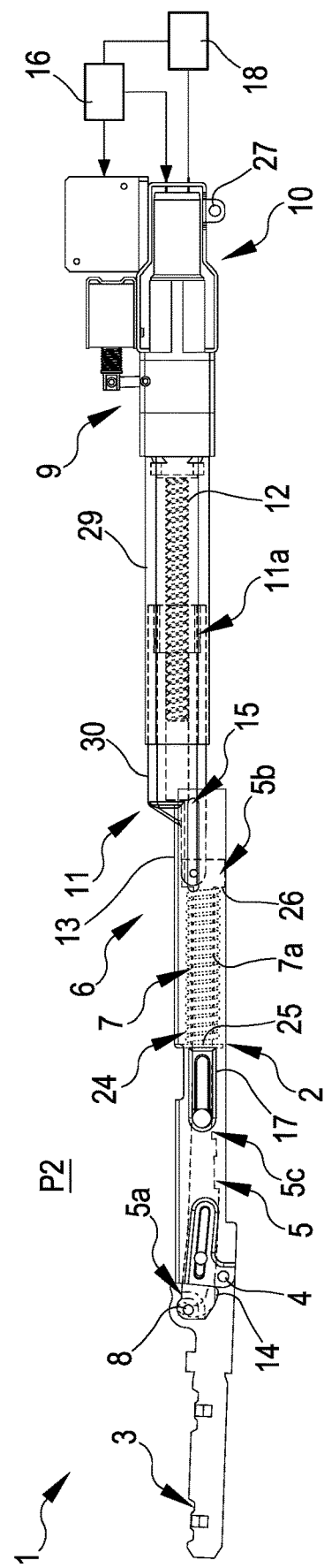

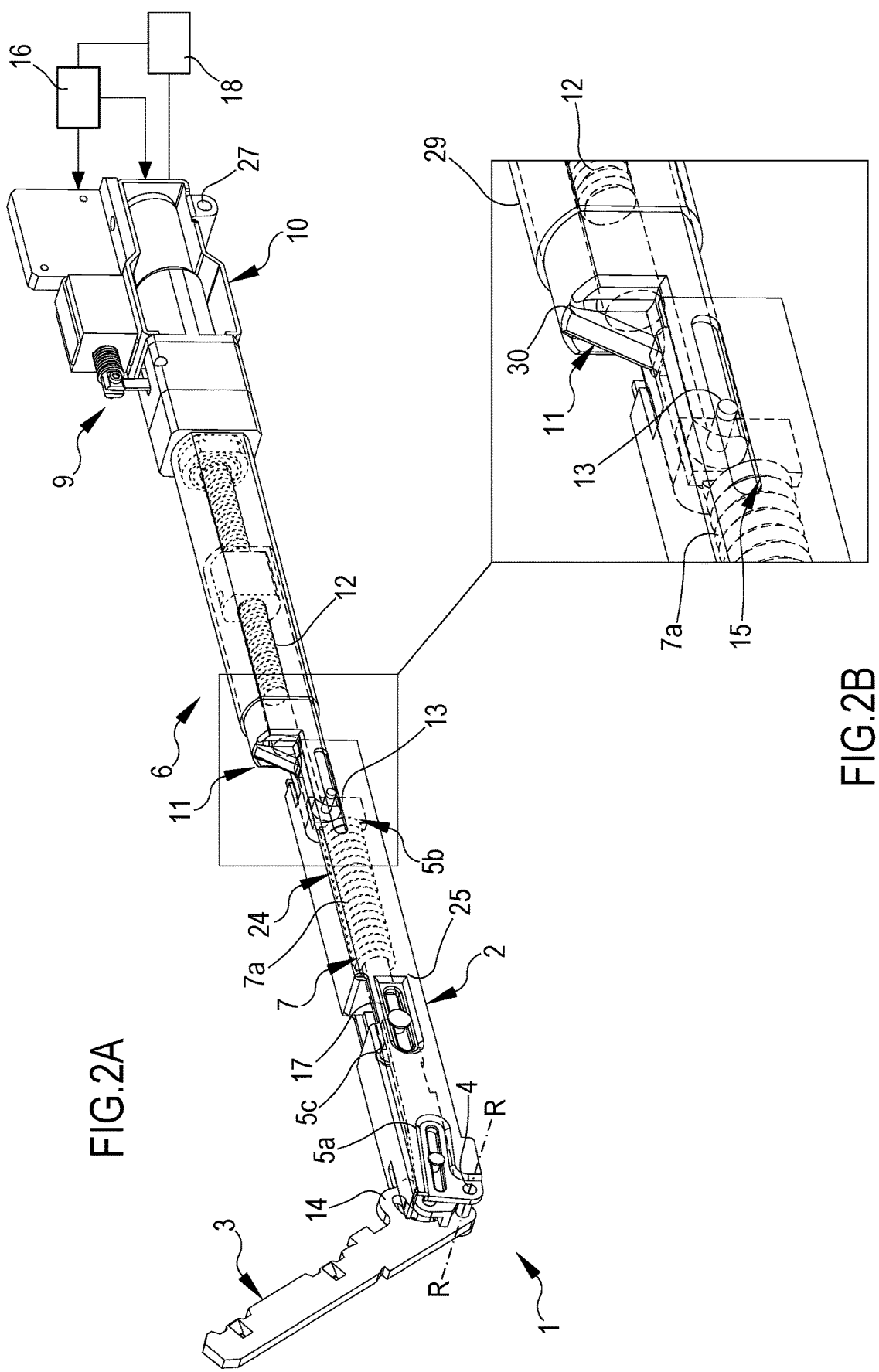

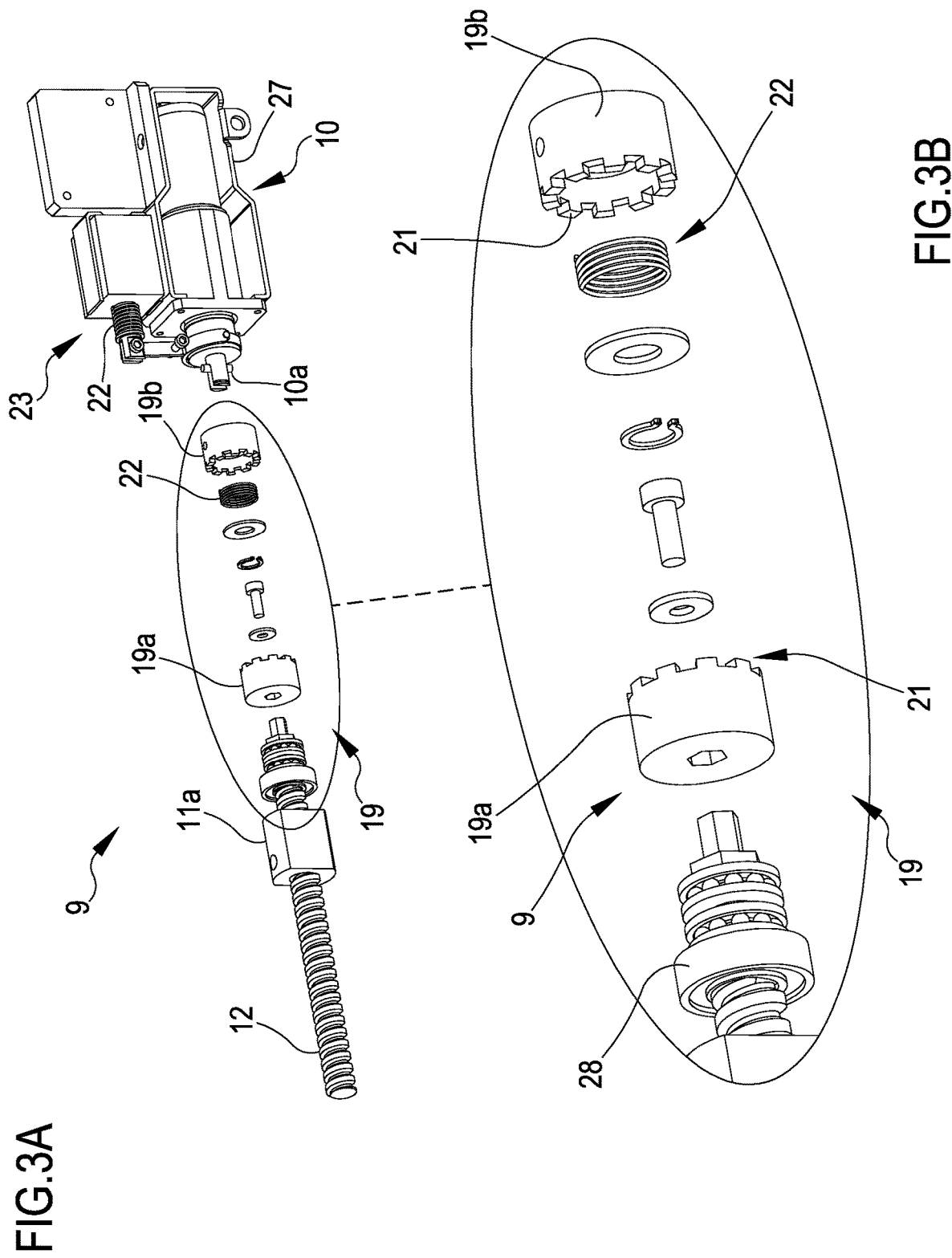

MOTORIZED HINGE

This Non-Provisional application claims priority to and the benefit of Italian Application No. 202019000002526 filed on 24 Jul. 2019, the content of which is incorporated herein by reference in its entirety.

FIELD OF THE INVENTION

The present invention relates to the field of hinges. The invention is mainly intended for the field of hinges made for connecting a door to a household appliance compartment, such as, for example, for connecting a door to an oven compartment. It should be noted that hereinafter, the term "household appliance" will generally refer to a household appliance or machinery of the type prevalently driven by electric current or gas, such as, for example, a refrigerator, dishwasher, oven, washing machine, etc.

Known Prior Art

In the known art, hinges used to connect a door to a household appliance compartment are known, such as, for example, the compartment of an oven, dishwasher and the like.

These hinges typically comprise a fastening bracket adapted to be fastened to the household appliance compartment and a movable support to rotatably constrain the door to such bracket. In particular, the movable support of the hinge, fastened to the door, is pivoted to the fastening bracket so that the door is rotatable around a rotation axis (e.g. horizontal or vertical) between an open position and a closed position.

Known hinges can also be provided with elastic means for leading the door towards the closed position. For example, in case of ovens, the elastic means can be coupled to an activating arm comprising a first end portion constrained to the door or better to the respective movable support, and a second end portion coupled to the fastening bracket. The elastic means can, for example, act on the first end portion, so as to move the door towards the closed position.

In order to facilitate the opening of the door, known hinges are provided with a motor drive, typically electrical, and are adapted to perform the opening/closing functions of the door. These hinges, for example, can be provided with a manual user control that, once actuated, turns on an electric motor to open or close the door. The electric motor, acting directly on the hinge of the door, is normally sized to fully move the door autonomously between the open position and the closed position.

In particular, in order to allow the door to move from the closed position to the open position, by counteracting the force exerted by the elastic means, the motor used on known hinges can be bulky and expensive, in addition to consuming a high amount of electric energy.

Known motorized w3edszhinges may also have difficulties in opening and closing the door (not fluid or tiring for the user) in case of motor malfunctions or in the absence of electric current. In certain cases, known motorized hinges could remain locked in the absence of electric current. This problem is particularly annoying when motorized hinges are installed on an oven. In this case, any absence of electric energy while cooking food, or even the malfunctioning of the motor of the hinge, could hamper the opening of the oven door, therefore resulting in a consequent excessive cooking time (also due to, for example, the oven's thermal inertia), which could ruin or burn the food inside of the oven itself.

SUMMARY OF THE INVENTION

Object of the present invention is to solve the aforesaid problems and to provide a hinge for connecting a door to a household appliance compartment able to be motorized, while simultaneously allowing a user to freely move the door when the door is stationary.

Another further object of the present invention is to provide a hinge able to be motorized by using an electric motor of reduced size and with reduced electric consumptions.

These and further objects are achieved by the present invention thanks to a hinge and to a household appliance according to the independent claims. Preferred aspects are set forth in the dependent claims.

In particular, according to an aspect of the present invention, the hinge for connecting a door to a household appliance compartment comprises a fastening bracket adapted to be fastened to the compartment of the household appliance and a movable support to rotatably constrain the door to the fastening bracket around a rotation axis.

The hinge further comprises an activating arm coupled to the fastening bracket, movement means adapted to move the activating arm, and elastic countering means functionally interposed between the fastening bracket and the activating arm.

The activating arm comprises a first end portion adapted to be constrained to the movable support of the door and a second end portion adapted to be coupled to the movement means intended to move the activating arm between an open position of the door and a closed position of the door.

According to an aspect of the present invention, the elastic countering means are functionally interposed so that to provide an elastic countering force adapted to lead the activating arm towards the closed position and/or towards the open position of door.

According to an advantageous aspect of the present invention, the movement means comprise an electric motor and reversible connecting means to couple and decouple selectively the electric motor and the activating arm, and, in particular, these means allow the direct or indirect coupling or decoupling of the drive shaft of such electric motor and the aforesaid second end portion of the activating arm.

The hinge is configured so as to ensure that, when the electric motor is coupled to the second end portion of the activating arm, the electric motor causes the movement of the activating arm, in particular it pushes or pulls the movable support of the door to make it rotate, while, when the electric motor is decoupled from the second end portion, the manual movement of the first end portion of the activating arm occurs independently of the electric motor (i.e. without operating on the motor) to allow a user to freely move the door.

This way, the second end portion of the activating arm can only be coupled to the electric motor when a door movement is required, a movement that is physically carried out by suitable movement means.

Preferably, the movement means comprise a slider linearly moved, by means of a screw for example, by means of the electric motor. The slider is constrained to the second end portion of the activating arm.

In particular, according to an aspect of the present invention, the second end portion of the activating arm is preferably constrained to the slider so that to be moved along a direction parallel to the movement of the slider.

Preferably, the first end portion and the second end portion of the activating arm are rotatably constrained to each other at an intermediate portion of the activating arm, for example by means of a pin arranged perpendicularly to the moving direction of the slider. More preferably, the first and the second end portions of the activating arm are rotatably constrained to each other around a rotation axis substantially parallel to the rotation axis of the support movable with respect to the fastening bracket. Further embodiments can however provide that the activating arm consists of a single piece (i.e. that the first end portion and the second end portion of the activating arm are integral with each other), still remaining within the protection scope of the present invention.

Some embodiments can provide that the electric motor is a magnetic linear motor, alternatively, as already mentioned, the movement means comprise a reversible screw adapted to be rotated by means of the electric motor (e.g. a direct-current electric motor). The slider is therefore coupled to the screw, preferably by means of a screw-nut screw coupling so as to transform the rotation of the screw into a translation of the slider. In this embodiment, the reversible connecting means are configured to couple and decouple selectively the electric motor and the screw.

Preferably, the activating arm is subjected to an elastic countering force adapted to lead this activating arm towards the closed position of the door. The aforesaid elastic countering force is provided by elastic countering means functionally interposed between the fastening bracket and the activating arm.

Some embodiments can provide that the elastic countering means comprise at least one spring functionally interposed between the second end portion of the activating arm and the fastening bracket. Alternatively or in addition, the elastic countering means preferably comprise a spring functionally interposed between the fastening bracket and an intermediate portion of the activating arm, comprised between the first and the second end portion.

According to an aspect of the present invention, the reversible connecting means comprise a joint of the coupling type, by means of complementary toothing for example, provided with a first member constrained to a driven member kinematically coupled to the activating arm, such as a screw for example, and a second member constrained to the drive shaft of the electric motor. The second member is movable with respect to the first member and/or vice-versa between a configuration of mutual engagement, wherein the rotation of the drive shaft of the electric motor is transferred to the activating arm, such as by means of the screw for example, and a configuration of mutual disengagement, wherein the activating arm and member to which it can be constrained, such as a screw, are free to move independently of the rotation of the drive shaft of the electric motor.

Advantageously, the reversible connecting means comprise elastic means configured to lead the second member and/or first member of the coupling joint to the configuration of mutual disengagement.

Preferably, the reversible connecting means comprise an electromagnet (or any electromechanical actuator known in the art) to lead the second member and/or first member of the coupling joint to the configuration of mutual disengagement.

According to a further aspect of the present invention, the reversible connecting means are configured to couple the electric motor to the activating arm and, in particular, to the second end portion of the activating arm, in response to a user actuation command.

Preferably, the hinge comprises means for detecting the electric current absorption of the electric motor. The position taken by the door during the movement between the open and closed positions preferably causes a variation in the electric current absorption of the electric motor and, since it is easily detectable, it can be advantageously used to obtain the position of the activating arm.

According to an aspect of the present invention, the movement means preferably comprise a connecting bracket configured to rotatably constrain the electric motor to the household appliance compartment.

A further object of the present invention is a household appliance comprising at least one hinge according to any one embodiment the present invention.

BRIEF DESCRIPTION OF THE FIGURES

Further aspects and advantages of the present invention will be more evident from the following description made for illustration purposes only and without limitation, referring to the accompanying schematic drawings, in which:

FIGS. 1A and 1B are side views of a particular embodiment of the hinge according to the present invention when the activating arm is in the closed position and in the open position of the door, respectively;

FIG. 2A is a perspective view of a particular embodiment of the hinge according to the present invention when the activating arm is in an intermediate position between the closed and the open positions of the door;

FIG. 2B is an enlargement of the view shown in FIG. 2A;

FIG. 3A is an exploded view of a particular embodiment of the reversible connecting means of the hinge according to the present invention;

FIG. 3B is an enlargement of the view shown in FIG. 3A;

EMBODIMENTS OF THE INVENTION

Figure 4A:
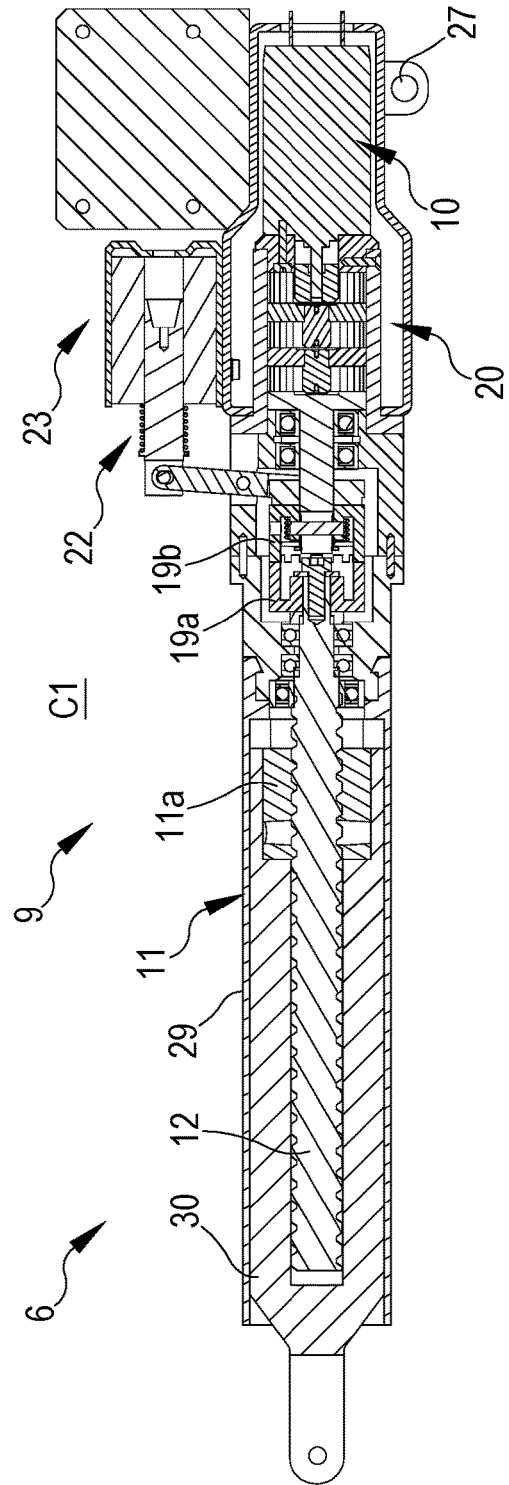
FIGS. 4A, 4B are longitudinal sectional views of a particular embodiment of the movement means of the hinge according to the present invention, when the reversible connecting means are respectively in a configuration of mutual engagement and in a disengagement configuration.

FIGS. 1A and 1B show a particular embodiment of the hinge 1 according to the present invention for connecting a door to a household appliance compartment. In particular, FIG. 1A shows the hinge 1 when the door is in a closed position P1, and FIG. 1B shows the hinge 1 when the door is in an open position P2.

The hinge 1 comprises a fastening bracket 2 adapted to be fastened to the compartment of the household appliance, for example by means of screws or other known fastening means. The door is configured to be rotatably constrained to the fastening bracket 2 by means of a movable support 3. This movable support 3, which can consist of an additional bracket, is stably fastened to the door, inside of a housing arranged inside the door itself for example, and is rotatably constrained to the fastening bracket 2, such as by means of a pin 4, so that the door can rotate around a rotation axis R-R (e.g. a horizontal axis) with respect to the fastening bracket 2.

In the embodiment herein shown, the movable support 3 is pivoted to the fastening bracket 2 so that when the movable support 3 is fastened to a respective door, the door is rotatably constrained to the fastening bracket 2 around a horizontal axis R-R.

Further embodiments can however provide that the movable support 3 is shaped variously and made integral with the door in ways per se known to the art, in addition to being pivoted to the fastening bracket 2 in various modes, still remaining within the scope of protection of the present invention.

The hinge 1 further comprises an activating arm 5 that can be coupled to the fastening bracket 2 and that is constrained to the movable support 3, or directly to the door, and movement means 6 adapted to move the activating arm 5 between an open position of the door P2 (shown by way of example in FIG. 1B) and a closed position of the door P1 (shown by way of example in FIG. 1A). In particular, the activating arm 5 comprises a first portion 5a rotatably constrained to the movable support 3 (e.g. by means of pins 8) and a second portion 5b adapted to be coupled to the movement means 6. The movement means 6 act on the second portion 5b of the activating arm 5 so as to move the activating arm 5 between the open position P2 and the closed position P1 of the door. It should be noted that in the embodiment shown herein, such first portion 5a and second portion 5b of the activating arm 5 are end portions, i.e. substantially the end parts of this arm 5. However, further configurations of the arm 5, that provide a first portion 5a thereof constrained to the movable support 3 and a different second portion 5b thereof that can be coupled, reversibly, to the aforesaid movement means 6, still fall within the scope of protection requested herein.

The hinge 1 further comprises elastic countering means 7 functionally interposed between the fastening bracket 2 and the activating arm 5.

The fastening bracket 2 comprises a housing 24, preferably a box-like body, for accommodating the activating arm 5.

With reference to FIGS. 1A, 1B and 2A, the elastic countering means 7 can be housed inside the housing 24 of the fastening bracket 2. In particular, the elastic countering means 7 can comprise a spring 7a fastened to a retainer 25 of the housing 24 and a retainer 26 of the second portion 5b of the activating arm 5. For example, the spring 7a can advantageously be a helical spring arranged coaxially around the drive shaft 5. The expansion action of the spring 7a tends to lead the activating arm 5 towards the closed position P1 of the door, preferably when the door reaches a given opening angle (e.g. less than 45°).

Some embodiments can provide that the elastic countering means 7 comprise a spring (not shown) functionally interposed between the fastening bracket 2 and an intermediate portion 5c of the activating arm 5, comprised between the first end portion 5a and the second end portion 5b.

The movement means 6 comprise an electric motor 10 and reversible connecting means 9 to couple and decouple selectively, or reversibly, the electric motor 10 and the activating arm 5 and, in particular, this electric motor 10 and the second portion 5b of the activating arm 5.

The hinge 1 is therefore configured so as to ensure that when the electric motor 10 is coupled to the second portion 5b of the activating arm 5, the actuation of the electric motor 10 causes the movement of the activating arm 5, whereas when the electric motor 10 is decoupled from this second portion 5b, the manual movement of the activating arm 5, and therefore of its first portion 5a, occurs independently of the electric motor 10 (i.e. without acting on the electric motor 10) so as to allow a user to freely move the door of the household appliance.

In other words, when the second portion 5b of the activating arm 5 is decoupled from the electric motor 10, the user can freely move the door, substantially as if there were no movement means 6, that is to say as if the hinge 1 was a non-motorized hinge. The second portion 5b can therefore only be coupled to the electric motor 10 when the movement means 6 are asked to move the activating arm 5.

As can be better seen below, these reversible connecting means 9, which can consist of a joint, such as of the coupling type, and which is functionally interposed between the electric motor 10 and the activating arm 5, can be controlled by a special electromagnetic member, such as by a manual switch or door movement sensor or even an electric current absorption detector of the electric motor 10 itself for example, so as to determine the mechanical coupling or decoupling of the motor 10 to/from the arm 5, depending on the operative requirements of the household appliance to which the hinge 1 is applied.

Preferably, these movement means 6 comprise a slider 11 linearly moved by means of the electric motor 10. This slider 11 is constrained to the second portion 5b of the activating arm 5 to move, by pushing or pulling for example, this activating arm 5 between the open position P2 and the closed position P1 of the door.

In particular, in the embodiment of the present invention shown in FIGS. 2A and 2B, the second portion 5b of the activating arm 5 is constrained to the slider 11, preferably by means of a connecting pin 13, slidable inside a guide 15 (for example a couple of grooves or slots) arranged on the side walls of the fastening bracket 2.

The guide 15 is preferably made so that the second end portion 5b of the activating arm 5 can be moved along a direction parallel to the movement of the slider 11.

Further embodiments can however provide that the second portion 5b of the activating arm 5 is for example indirectly constrained to the slider 11 of the movement means 6, for example by means of a connecting lever (not shown) functionally interposed between the second end portion 5b of the activating arm 5 and the slider 11, still remaining within the protection scope of the present invention.

With reference to FIGS. 1A and 1B, the first end portion 5a of the activating arm 5 is constrained to the movable support 3 by means of a pin 8. Such pin 8 goes through a hole made on the first end portion 5a of the activating arm 5 and is slidable along a guide 14 (for example a slot) made on the movable support 3.

The slot, or in general the guide 14, is advantageously shaped to impose a given law of motion to the movable support 3 during the movement between the open position P2 and the closed position P1 of the door and to transmit the motion from the activating arm 5 to the movable support 3 according to certain predefined distance ratios. The shape of the slot 14 is selected during the design step to obtain a fluent door movement during the opening and closing thereof.

In addition to making it possible to reduce the force needed for the movement means 6 to move the activating arm 5, this configuration makes it possible to obtain a door movement with a given pattern, such as, for example, with given accelerations or decelerations or substantially uniform (that is to say without accelerations or decelerations) during its path between the closed position P1 and the open position P2.

This way, by way of example, some embodiments can provide that the electric motor 10 is a magnetic linear motor typically comprising a slider 11 arranged on a sliding guide (stator) integrated within the magnetic linear motor. The slider 11 is moved along the sliding guide by means of a magnetic field provided by coils arranged on the sliding guide. In this case, the slider and the sliding guide are magnetically coupled to one another when the coils are driven. When the magnetic linear motor is deactivated, the slider 11 freely slides on the sliding guide, in particular when this slider and the relative guide are shaped to be mutually separated by a layer of air. In this embodiment, the movement means 6 have the aforesaid reversible connecting means (constituted, for example, by a switch for selectively activating and deactivating the power supply of the magnetic linear motor) configured for the selective magnetic coupling and magnetic decoupling of the sliding guide and the slider 11.

With reference to FIGS. 1A, 1B and 2A, in the embodiment of the invention herein shown, the movement of the slider 11 preferably occurs by means of a screw 12 of the reversible type, which is rotated by the electric motor 10. The slider 11 is coupled, such as by means of a complementary nut screw 11a for example, to the screw 12, so as to transform the rotation of the screw 12 into a translation of the slider 11.

Surprisingly, a multi-threaded screw 12, preferably with more than two threads (e.g. with five threads) and with a pitch between 15 and 35 mm, preferably with a pitch between 20 mm and 30 mm (e.g. with a pitch of about 25 mm), provides optimal performance in terms of the reversibility and reduction of friction between the slider 11 and the screw 12 (with a screw-nut screw coupling). In particular, when the reversible connecting means 9 decouple the second portion 5b of the activating arm 5 from the electric motor 10, the translation of the slider 11, due to a manual movement of the door, causes the rotation of the screw 12 with reduced friction. In other words, the transformation of the translatory motion of the slider 11 into a rotary motion of the screw 12 produces a substantially negligible frictional force.

With reference to the embodiment of FIGS. 1A, 1B, 2A, and 2B, the first end portion 5a and the second end portion 5b of the activating arm 5 are rotatably constrained to each other at an intermediate portion 5c of the activating arm 5, for example by means of a pin 17 arranged perpendicularly to the moving direction of the slider 11. Further embodiments can however provide that the activating arm 5 consists of a single piece (e.g. that the first end portion 5a and the second end portion 5b of the activating arm 5 are integral with each other) still remaining within the protection scope of the present invention.

According to a preferred aspect of this invention, the hinge 1 may comprise a logic control unit 16 intended to control, in response to one or more control signals of the manual type and/or of the type generated automatically by special sensors or system status detectors, the movement means 6 of the activating arm 5 and, in particular, at least the aforesaid reversible connecting means 9 to couple and decouple the electric motor 10 and the activating arm 5.

This logic control unit 16, according to an aspect of the present invention, can preferably be configured to actuate the movement means 6, and/or in particular the aforesaid reversible connecting means 9 in response to a user actuation command. This actuation command can, for example, be imparted by means of a button and/or by means of a vocal command or other.

The logic unit 16 can preferably be configured to control at least the reversible connecting means 9 so as to couple the electric motor 10 to the second portion 5b of the activating arm 5 in response to the aforesaid actuation command.

Alternatively, or in conjunction with a manual control, the actuation command of the logic unit 16 can be, as mentioned, imparted by sensors or by other status detection means of the system and able to detect the need to actuate the movement means 6 and/or operate the coupling or decoupling of the reversible connecting means 9.

For example, as already mentioned, some embodiments of this invention can provide that the hinge 1 is equipped with means 18 to detect the current absorption of the electric motor 10 (symbolically shown with a rectangle), such as an ammeter or similar means for example. This embodiment can also provide that the aforesaid means 18 to detect the current absorption of the electric motor 10 provide an absorption value indicative of the position assumed by the activating arm 5 during its path between the open position P2 and the closed position P1 of the door.

In particular, the weight force of the door generates a moment that varies according to the position assumed by the door and causes a different current absorption of the electric motor. In other words, as the door rotates from the closed position P1 towards the open position P2, the weight force acting on the door generates an increasing moment that can be detected by the means 18 to detect the current absorption of the electric motor. Moreover, by means of one or more cam profiles provided for example on the sliding surface between the activating arm 5 and the fastening bracket 2, it is possible to cause easily detectable current absorption variations of the electric motor 10 during the path of the activating arm 5 between the position P1 and the position P2. A logic control unit 16 (also symbolically shown with a rectangle) can recognize these variations and can thus associate them to one or more of the aforesaid positions of reference of the activating arm 5. This way, it is possible to obtain an indication of the real position of the activating arm 5 with respect to the fastening bracket 2.

It should be noted that further embodiments of the hinge 1 according to the present invention can provide that the hinge 1 is not directly equipped with a logic control unit 16 and/or means 18 to detect the electric current absorption of the electric motor. However, these components can be, for example, provided in a household appliance (such as an oven, for example) comprising the hinge according to the present invention. In this case, the logic control unit 16 and/or means 18 to detect the current absorption of the electric motor can be connected to the electric motor 10 of the hinge 1 and/or to the reversible connecting means 9, such as by means of electric wires, or in other known ways of the art.

With reference to FIGS. 3A and 3B, the reversible connecting means 9, which, as mentioned, are configured to couple and decouple selectively the electric motor 10 and the activating arm 5, are functionally interposed, in this embodiment of the invention, between this motor 10 and a screw 12 that, as mentioned, enables the actuation of a slider 11 intended to transmit a pushing or pulling motion, or any other motion that allows the rotation of the door, to the activating arm 5. In this embodiment, the reversible connecting means 9 comprise a coupling joint 19 provided with a first member 19a constrained to said screw 12 and a second member 19b constrained to the motor shaft 10a of said electric motor 10.

For example, this coupling joint 19 can be of the type comprising, on the relative rotating members 19a, 19b, complementary coupling profiles, such as for example with teeth or of the type with protrusions and recesses, able to transmit a torque from one member to the other 19a, 19b when they are mutually engaged.

It should be noted that a coupling joint 19 of this type, and in particular of the type described below, can be interposed to couple and decouple selectively any two rotating members arranged downstream of the electric motor 10, independently of the use of a screw 12 to transform the rotary motion of the motor shaft of the motor 10 into the translatory, or rotary-translatory or even rotary motion of the activating arm 5. In other words, independently of the arrangement used for the possible transformation of the rotary motion of the electric motor 10 into the motion required by the activating arm 5, this coupling joint 19, which belongs to a preferred embodiment of the aforesaid reversible connecting means 9, can be interposed between any two rotating members, such as, for example, two shafts that transmit the rotary motion generated by the electric motor 10 to the motion transformation arrangement possibly positioned upstream of the aforesaid activating arm 5.

Figure 4B:
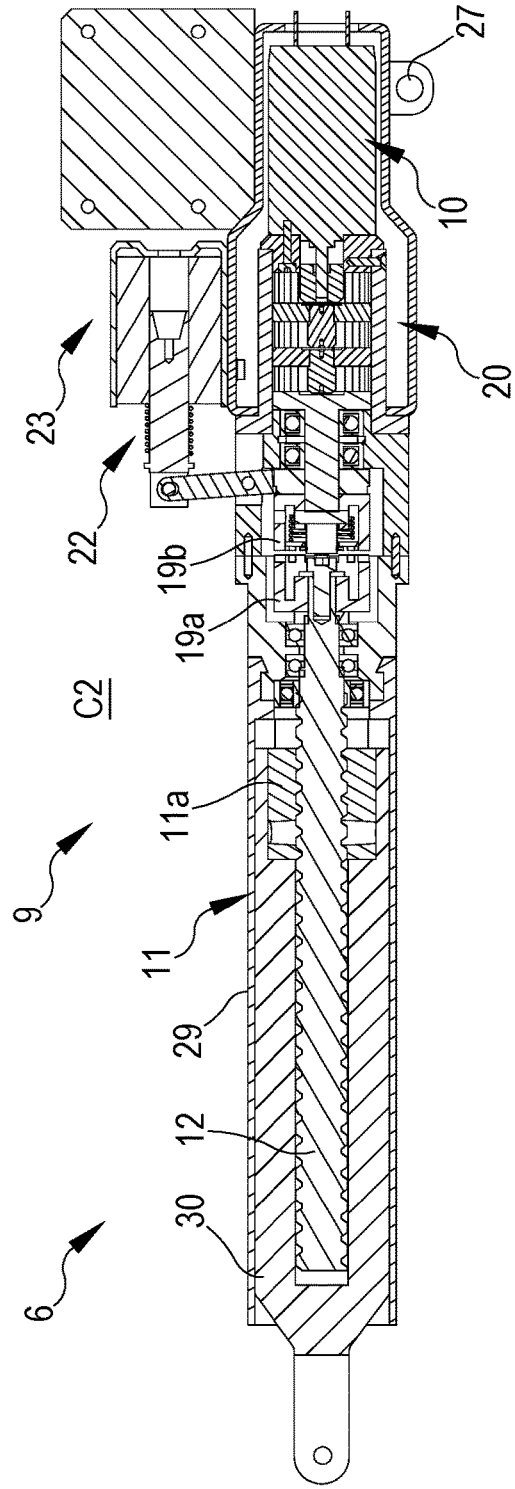

With reference to the FIGS. 4A and 4B, in the embodiment herein shown, the second member 19b is movable, for example axially, with respect to the first member 19a between a configuration C1 of mutual engagement, wherein the rotation of the motor shaft 10a of the electric motor 10 is transferred to the screw 12, and a disengagement configuration C2, wherein the screw 12 is free to rotate independently of the rotation of the motor shaft 10a.

Preferably, an epicyclic reduction gear 20 adapted to reduce the number of revolutions of the motor shaft of the electric motor 10 can be interposed between the second member 19b of the coupling joint 19 and the electric motor 10. In general, the reference 10a therefore denotes the motor shaft moved by means of the electric motor 10, this motor shaft 10a can therefore be the motor shaft exiting the epicyclic reduction gear 20 or exiting further other stages arranged between the electric motor 10 and the second member 19b of the coupling joint 19.

Although the embodiment shown in FIGS. 4A and 4B provides that the second member 19b is movable with respect to the first member 19a of the coupling joint 19, further embodiments can provide that the first member is movable with respect to the second member or that both the first and second members are movable with respect to one another, still remaining within the scope of protection of the present invention.

The first and second members 19a, 19b have complementary edges, preferably provided with slightly tapered teeth (visible, for example, in FIG. 3B) adapted to engage with one another in the configuration of mutual engagement C1 shown in FIG. 4A.

Preferably, the reversible connecting means 9 comprise elastic means 22 configured to lead the first and second members of the coupling joint 19 to the disengagement configuration C2. For example, the elastic means 22 can comprise a spring arranged between the first and second members 19a, 19b of the coupling joint 19, the spring being shaped to push a member 19a away from, and thus disengaging it from, the other member 19b.

In this embodiment, with reference to FIG. 3A, the reversible connecting means 9 further comprise an electromagnet 23 to lead, when they are actuated, the first and second members 19a, 19b of the coupling joint 19 to the configuration of mutual engagement C1. This actuator 23 is preferably controlled by the logic control unit 16 (as symbolically shown in FIGS. 1A, 1B and 2A).

In particular, in response to a user actuation command and/or in response to an actuation command generated automatically by sensors or detectors of the hinge 1 or by the household appliance, the logic control unit 16 actuates (i.e. energizes) the electromagnet 23, which moves the second member 19b of the coupling joint 19 towards the configuration of mutual engagement C1 shown in FIG. 4A. Once the configuration of mutual engagement C1 has been reached, the logic control unit 16 controls the actuation of the electric motor 10. In particular, in the embodiment of the invention herein shown, the electric motor 10 is actuated to rotate the screw 12 in one direction or in the opposite direction depending on the position of the door. This position can, for example, be detected by an encoder configured to detect the number of revolutions accomplished by the electric motor 10 or with known means detecting the position of the door, or with microswitches automatically operated depending on the position of the door itself, or even preferably with means 18 to detect the electric current absorption of the motor 10 previously described.

When the electric motor 10 is actuated, the rotation of the motor shaft 10a, i.e. the relative torque, is transferred from the second member 19b to the first member 19a of the coupling joint 19 and therefore to the screw 12 that translates the slider 11 to move the activating arm 5 between the closed position P1 and the open position P2 of the door.

When one of the aforesaid positions P1, P2 has been reached, variously detected as mentioned above, the logic control unit 16 controls the switching off of the electric motor 10 and of the electromagnet 23. By means of the spring 22 arranged between the first and second members 19a, 19b of the coupling joint 19 (and possibly by means of a spring 22 provided on the electromagnet 23), the coupling joint 19 is led into the disengagement configuration C2 wherein the electric motor 10 and the screw 12 are decoupled.

In this configuration, the manual movement of the door by a user can be carried out effortlessly, substantially as if there were no movement means 6.

This solution is advantageous also in case of absence of electric current while the door is being moved by means of the movement means 6. In particular, if the electric current is interrupted during the movement of the door by means of the electric motor 10, the electromagnet 23 is no longer energized, the electric motor is inactive and the screw 12 stops. In this case, the elastic force of the spring 22 brings the first member 19a away from the second member 19b of the coupling joint 19, leading them in the disengagement configuration C2 and therefore decoupling the electric motor 10 from the screw 12.

In this configuration, the door can, for example, be brought back towards the closed position P1 by means of the elastic countering force acting on the activating arm 5, provided by the elastic countering means housed in the fastening bracket 2.

In order to simplify the design of the hinge 1, the movement means 6 can advantageously comprise a connecting bracket 27 configured to rotatably constrain the electric motor 10 to the household appliance compartment. In particular, between the closed position P1 and the open position P2 of the door, the movement of the activating arm 5 causes a rotation of the connecting bracket 27 to which the electric motor 10 is fastened.

If the movement means 6 comprise, by way of example, the screw 12 of the embodiment herein shown, this rotation occurs both when the electric motor 10 is coupled to the screw 12 and when the electric motor 10 is decoupled from it.

In particular, during the disengagement configuration C2 between the first and second members 19a, 19b of the coupling joint 19, the screw 12 can freely rotate following the translation of the slider 11 caused by the manual movement of the door. In order to further reduce the friction, the screw 12 can preferably be supported by means of a ball bearing 28 (visible in FIG. 3B) arranged inside a casing 29 inside which the screw 12 itself is housed. The slider 11 further comprises a tubular element 30 arranged coaxially with the screw 12 inside the casing 29. The rotation of the connecting bracket 27 makes it possible to substantially maintain the tubular element 30 of the slider 1 coaxial with the screw 12 by further reducing the friction and therefore increasing the fluidity of the manual movement of the door when the electric motor is decoupled from the activating arm 5.

Finally, it should be noted that although selective connecting means 9 of the type comprising a coupling joint 19 are described herein, other selective connecting means, for example acting directly on the electric motor 10 or on its components such as for the magnetic linear motor mentioned, a linear electric motor or any other type known in the art and able to interrupt or connect the mechanical members to one another for the transmission of motion, can be used without for this reason departing from the scope of the present invention.

The invention claimed is:

1. Hinge (1) for connecting a door to a household appliance compartment, comprising
   a fastening bracket (2) adapted to be fastened to the compartment of said household appliance,
   a movable support (3) to rotatably constrain said door to said fastening bracket (2) around a rotation axis (R-R),
   an activating arm (5) coupled to said fastening bracket (2),
   movement means (6) adapted to move said activating arm (5),
   elastic countering means (7) functionally interposed between said fastening bracket (2) and said activating arm (5),
   said activating arm (5) comprising a first portion (5a) adapted to be constrained to said movable support (3) and/or to said door, and a second portion (5b) adapted to be coupled to said movement means (6) to move said activating arm (5) between an open position (P2) of the door and a closed position (P1) of the door,
   and wherein said movement means (6) comprise an electric motor (10), the hinge being characterized in that said movement means (6) further comprise reversible connecting means (9) to couple and decouple selectively said electric motor (10) and said second portion (5b) of the activating arm (5),
   said electric motor (10) causing the activating arm (5) to move when said reversible connecting means (9) determine the coupling between said electric motor (10) and said second portion (5b) of the activating arm (5), the movement of the activating arm (5) occurring freely when said reversible connecting means (9) determine the decoupling of said electric motor (10) from said activating arm (5).

2. Hinge (1) according to claim 1, wherein said movement means (6) comprise a slider (11) moved linearly by means of said electric motor (10), said slider (11) being constrained to said second portion (5b) of the activating arm (5).

3. Hinge (1) according to claim 2, wherein said first end portion (5a) and said second end portion (5b) of the activating arm (5) are rotatably constrained to each other at an intermediate portion (5c) of the activating arm.

4. Hinge (1) according to claim 3, wherein said first end portion (5a) and said second end portion (5b) of the activating arm (5) are rotatably constrained to each other around a rotation axis parallel to said rotation axis (R-R).

5. Hinge (1) according to claim 1, wherein said electric motor (10) is a linear magnetic motor.

6. Hinge (1) according to claim 1, wherein said movement means (6) comprise a reversible screw (12) adapted to be rotated by means of said electric motor (10), said slider (11) being coupled to said screw (12) so that to transform the rotation of the screw (12) into a translation of the slider (11), said reversible connecting means (9) being configured to couple and decouple selectively said electric motor (10) and said screw (12).

7. Hinge according to claim 1, wherein said reversible connecting means (9) comprise a coupling joint (19) provided with a first member (19a) indirectly constrained to said activating arm (5) and a second member (19b) directly or indirectly constrained to the motor shaft (10a) of said electric motor (10), said second member (19b) being movable with respect to said first member (19a) and/or vice-versa between a configuration of mutual engagement (C1) wherein the rotation of the motor shaft (10a) of the electric motor (10) is transferred to said activating arm (5) and transformed into an at least partially translatory motion, and a disengagement configuration (C2) wherein the activating arm (5) is free to move independently of the rotation of the motor shaft (10a) of said electric motor (10).

8. Hinge (1) according to claim 6, wherein said reversible connecting means (9) comprise a coupling joint (19) provided with a first member (19a) constrained to said screw (12) and a second member (19b) constrained to the motor shaft (10a) of said electric motor (10), said second member (19b) being movable with respect to said first member (19a) and/or vice versa between a configuration of mutual engagement (C1) wherein the rotation of the motor shaft (10a) of the electric motor (10) is transferred to the screw (12), and a disengagement configuration (C2) wherein the screw (12) is free to rotate independently of the rotation of the motor shaft (10a) of said electric motor (10).

9. Hinge (1) according to claim 7, wherein said reversible connecting means (9) comprise elastic means (22) configured to lead said second member (19b) and/or said first member (19a) of said coupling joint (19) to said disengagement configuration (C2).

10. Hinge (1) according to claim 7, wherein said reversible connecting means (9) comprise an electromagnet (23) to lead said second member (19b) and/or said first member (19a) of said coupling joint (19) to said configuration (C1) of mutual engagement.

11. Hinge (1) according to claim 1, wherein said reversible connecting means (9) are configured to couple said electric motor (10) to said second portion (5b) of said activating arm (5) in response to an activating command of a user.

12. Hinge (1) according to claim 1, wherein said elastic countering means (7) are arranged to lead said activating arm (5) towards said closed position (P1) of the door.

13. Hinge (1) according to claim 12, wherein said elastic countering means (7) comprise at least one spring (7a) functionally interposed between the second end portion (5b) of the activating arm (5) and the fastening bracket (2).

14. Hinge (1) according to claim 12, wherein said elastic countering means (7) comprise a spring functionally interposed between the fastening bracket (2) and an intermediate portion (5c) of the activating arm (5) comprised between said first end portion (5a) and said second end portion (5b).

15. Hinge (1) according to claim 1, wherein said movement means (6) comprise a connecting bracket (27) configured to rotatably constrain said electric motor (10) to the compartment of said household appliance.

16. Hinge (1) according to claim 1, comprising means (18) for detecting the absorption of electric current of said electric motor (10).

17. Household appliance comprising at least one hinge (1) according to claim 1.

\* \* \* \* \*